United States Patent [19]
Muckelroy

[11] 3,726,006
[45] Apr. 10, 1973

[54] METHOD FOR SINTERING THICK-FILM OXIDIZABLE SILK-SCREENED CIRCUITRY

[75] Inventor: William L. Muckelroy, Washington, D.C.

[73] Assignee: The United States of America as represented by the Secretary of the Army, Washington, D.C.

[22] Filed: Apr. 28, 1971

[21] Appl. No.: 138,051

[52] U.S. Cl. ....................29/625, 29/577, 29/588, 29/626, 29/627, 174/52

[51] Int. Cl. ....................B41m 3/08, H05k 3/28

[58] Field of Search .................... 29/624–627, 577, 589–591; 317/234 B, 101; 174/52 S, DIG. 3

[56] References Cited

UNITED STATES PATENTS

| | | | |
|---|---|---|---|
| 3,290,569 | 12/1966 | Weimer | 317/235 B |
| 3,374,400 | 3/1968 | Sellchi Tabuchi | 174/DIG. 3 |
| 3,404,319 | 10/1968 | Shigeru Tsuui | 174/DIG. 3 |
| 3,404,215 | 10/1968 | Burk et al. | 174/DIG. 3 |
| 3,435,516 | 4/1969 | Kilby | 29/627 |
| 3,648,357 | 3/1972 | Green | 29/492 |

*Primary Examiner*—Richard J. Herbst
*Assistant Examiner*—Joseph A. Walkowski
*Attorney*—Harry M. Saragovitz, Edward J. Kelly, Herbert Berl and Saul Elbaum

[57] ABSTRACT

A method for sintering thick-film oxidizable silk-screened circuitry comprising printing a glass land surrounding the microcircuit, thereby forming a bridge, on the substrate and covering the same with a glass plate in a non-oxidizing atmosphere, and sintering the same is disclosed.

16 Claims, 5 Drawing Figures

INVENTOR
WILLIAM L. MUCKELROY

BY Harry M. Saragovitz, Edward J. Kelly, Herbert Berl, & Saul Elbaum

ATTORNEYS

INVENTOR
WILLIAM L. MUCKELROY

BY Harry M. Saragovitz, Edward J. Kelly, Herbert Berl, & Saul Elbaum

ATTORNEYS

METHOD FOR SINTERING THICK-FILM OXIDIZABLE SILK-SCREENED CIRCUITRY

The invention described herein may be manufactured, used and licensed by or for the United States Government for Governmental purposes without the payment to me of any royalty thereon.

BACKGROUND OF THE INVENTION

This invention relates to printed circuitry and methods of making the same, and more particularly this invention relates to an improved method for sintering thick-film oxidizable silk-screened circuitry.

In the past printed circuitry has relied extensively on the noble metals, and more particularly on gold, for their conductive properties as well as their relatively inert chemical properties. It has been found, however, that for many applications certain oxidizable metals such as copper are preferred to the noble metals. For this reason various methods and compositions have been developed for using copper instead of one of the noble metals. Typically, a paste is made of finely divided copper or copper oxide and a glass flux. The paste is printed on a refractory substrate and then sintered in a controlled atmosphere.

The term "refractory substrate" is used herein to mean a body made of a material which will not melt, decompose or materially change its shape or composition under the processing conditions involved in forming the copper layer. The refractory substrates suitable for use in printed circuitry utilizing a conductive layer of copper are generally classified into four broad groups. The first such group includes the single crystalline materials such as sapphire and semi-conductors which include, for example, reduced barium titanate and reduced rutile. The second group includes the amorphous materials such as silicate glass. The third group includes materials known as "cermets" such as chromium-chromium oxide. The fourth group includes the polycrystalline materials such as ceramics and includes, for example, porcelains, steatites, aluminas and ferrites. The present invention will be described with reference to the ceramics and, more particularly, substrates of alumina, although it should be understood that the present invention is equally applicable to the other ceramic materials.

The application of the copper to the substrate can not be easily accomplished by the use of powder metallurgical techniques since elemental copper does not wet and bond to the substrates. The use of copper oxide instead of copper has eliminated the problem of wetting and bonding, but it has been found that copper oxide does not provide a highly conductive layer. Thus, methods have been developed for using copper and a glass flux to provide a continuous adherent layer of elemental copper with excellent conductivity. Such processes entail critical firing procedures using a controlled atmosphere.

The copper used in the paste could be either elemental copper or copper oxide. Whether elemental copper or copper oxide is used, it should be in the form of finely divided particles so that a continuous copper layer is formed on the ceramic substrate. Generally a mean particle size range which is suitable is 0.5 to 25 microns, with the preferred range being between 0.5 and 15 microns. Smaller particles are equally satisfactory.

As for the glass flux, a glass which fuses and bonds to the ceramic substrate at a temperature below the melting point of copper and resists reduction under the usual processing conditions should be used.

Glasses having these properties are readily compounded from mixtures of silica ($SiO_2$) and various combinations of the oxides of sodium ($Na_2O$), calcium ($CaO$), barium ($BaO$), magnesium ($MgO$), aluminum ($Al_2O_3$), boron ($B_2O_3$), potassium ($K_2O$) and phosphorus ($P_2O_5$), among other elements. Table 1 is illustrative of some suitable glasses which can be conveniently compounded from typical oxides specified as to kind and amount in the table. The table is not intended to be exhaustive of suitable glasses but indicates the general composition of some readily fusible non-reductible glasses. It is noted that this table encompasses many common types of glasses such as the borosilicates, phosphates and silicates.

TABLE I

| Melt Ingredient: | Parts by weight |
|---|---|
| $Li_2O$ | 0–15 |
| $Na_2O$ | 0–25 |
| $CaO$ | 0–10 |
| $BaO$ | 0–20 |
| $MgO$ | 0–2 |
| $Al_2O_3$ | 0–35 |
| $SiO_2$ | 5–80 |
| $B_2O_3$ | 0–30 |
| $K_2O$ | 0–5 |
| $P_2O_5$ | 0–80 |

In the preparation of the glasses, the ingredients are smelted together in a furnace at a temperature sufficient to melt but not volatilize the constituent oxides, for example, between about 1,100° C. and 1,500° C., until a mass of uniform quality has been obtained. The melt is fritted by pouring into cold water, and the resultant frit is ground to the fineness desired. It is desirable for the glass particles to be finely divided, for example, in the order of one-half micron to 25 microns particle size, so that the paste mixture will, under the processing conditions, result in a continuous copper layer adherently bonded to the substrate.

The glass and copper particles are suspended in a volatile and decomposable fluid suspending agent and applied to the refractory oxide by any convenient method, for example, by dipping, brushing or spraying. The relative amounts of copper and glass used may vary over fairly wide limits. The main consideration is that the metal content be sufficiently high to insure that the resulting metal film after processing is continuous. Generally, between five to 50 parts by weight of copper is used for each part by weight of glass. The amount of fluid used as suspending agent depends on the method of application. If spraying is used, a relatively thin suspension is required. If brushing or "squeegee" screen processes are employed, thicker paste suspensions are permitted. The thickness of the applied paste suspension should be such as to insure good conductivity of the copper layer formed by the methods of the present invention. A 0.5 mil thick copper layer is adequate. 1.0 mil thick copper layers exhibit excellent conductivity. Greater thicknesses are also feasible.

The fluid suspending medium serves to disperse the paste mixture in the desired pattern on the substrate and to hold the paste in this pattern until processing commences. During processing the suspending medium should volatilize, leaving no residue. The suspending medium should not react with the metallic or glass components of the coating composition before or during firing.

To insure proper dispersion and bonding of the paste, many of the common suspending media contain two components. The first component acts as a dispersion medium for the paste and as a solvent for the second component which insures proper bonding of the paste to the substrate until processing commences. Examples of suitable dispersion media which are solvents for the below listed binders are benzene; the esters of fatty acids; alcohols of low molecular weight such as ethyl, butyl, and amyl; acetates including "Cellosolve acetate" (ethylene glycol monoethyl ether acetate), and "Carbitol acetate" (diethylene glycol monoethyl ether acetate); ketones such as acetone and methylethyl-ketone; and higher ethers such as glycol diethyl ether. Suitable binders are, for example, the vinyl or substituted vinyl polymers such as polymethylmethacrylate, polyethylmethacrylate, polybutylmethacrylate, and polyisobutylmethacrylate and the cellulose esters and ethers such as cellulose nitrate, cellulose acetate, cellulose butyrate, methyl cellulose and ethyl cellulose. Rohm and Haas "Acryloid A-10," a solution of 30 percent polymethylmethacrylate solids in "Cellosolve acetate" has proved a good suspending medium.

In general, any ceramic which is resistant to the usual processing conditions may be used as the refractory substrate. The following table is illustrative of various ceramic compositions that have successfully been used. The compositions are expressed in parts by weight.

TABLE II

| | Porcelain | | | | Steatite | Alumina | |
|---|---|---|---|---|---|---|---|
| Composition | A | B | C | D | E | F | G |
| Feldspar | 35 | 50 | 30 | 25 | | | |
| Ball Clay | 15 | 10 | 8 | 10 | | | |
| Kaolin | 30 | 30 | 37 | 40 | 15 | | |
| Talc | | | | | 60 | | |
| Dolomite | | | | 2 | | | |
| $BaCO_3$ | | | | | 17.5 | | |
| $MgCO_3$ | | | 1 | | 7.5 | | |
| $SiO_2$ | 20 | 10 | 25 | 22 | | 9–10 | 2 |
| CaO | | | | | | 1 | 1 |
| MgO | | | | | | 3–4 | 1 |
| $Na_2O$ | | | | | | 1–5 | ½ |
| $Al_2O_3$ | | | | | | (1) | 95.5 |

[1]Remainder.

In a typical process, firing of the coated refractory substrate is done in a furnace in which both atmosphere and temperature can be controlled. The first firing is done in an oxidizing atmosphere, for example, air, oxygen or oxygen mixed with an inert gas such as nitrogen. This firing step is carried out under conditions sufficient to volatilize the fluid suspending media, to oxidize at least the surface portion of the copper particles if metallic copper was initially used, and to commence formation of a refractory substrate-to-glass-to-copper oxide bond. The temperatures and firing times are interdependent in that the higher the temperature, the shorter the firing time required to achieve these effects. The maximum permissible temperature is limited by the melting point of copper. The minimum temperature is determined by the volatilization temperature of the fluid suspending vehicle used and the temperature required to commence formation of the refractory substrate-to-glass-to-copper oxide bond. This bonding temperature is dependent upon the temperature required to partially sinter the glass and to cause wetting of the refractory substrate and at least part of the copper oxide by the glass. Such wetting and sintering temperatures are dependent upon the glass flux used. Temperatures ranging from, for example, 500° C. to 1,050° C. for 2 to 60 minutes have been successfully used, with an intermediate range of 700°–900° C. for 10 to 30 minutes and a preferred temperature of 750° C. for 15 minutes. Longer firing times are not harmful, however.

After the oxidizing cycle is complete, the coated refractory substrate is fired in a controlled atmosphere of 55 to 89 percent by volume of nitrogen, 8 to 44 percent by volume of hydrogen and 0.4 to 6 percent by volume of oxygen. This second firing may commence immediately after the first firing without any cooling of the refractory substrate. Alternatively, the refractory substrate may be cooled before undergoing this second firing. The times and temperatures of this firing are again variable and interdependent. The only requirements are that the refractory substrate-to-glass-to-copper oxide bond be completed and the copper oxide which has not been wet by the glass be reduced. The maximum temperature is limited by the melting point of copper while the minimum temperature is again dependent upon the wetting and sintering temperature of the glass flux employed and the temperature required to reduce the copper oxide which has not been wet by the glass. Temperatures ranging from, for example, 600° C. to 1,050° C. for 15 minutes to 2 hours have proven satisfactory with an intermediate range of approximately 750° C. to 950° C. for 20 minutes to 1 hour and a preferred temperature of 850° C. for 30 minutes. Again, longer firing times are not harmful.

More typically, sintering a copper thick-film paste must be in a non-oxidizing atmosphere since it easily oxidizes at high temperature. Usually nitrogen is used as the non-oxidizing atmosphere. In order to sinter an oxidizing metallic thick-film paste such as copper that has been screened onto a ceramic substrate, the sintering furnace must first be purged of any oxidizing atmosphere. Usually this means an oxygen content of approximately 0.01 percent by volume. When the oxidizable metallic material is copper, an atmosphere of super dry nitrogen with 0.002 percent oxygen content is usually used. Using the normal thick-film firing furnace this type of firing requires gas flows of up to 60 cubic feet per hour for each section with nitrogen exhaust and entrance curtains. Each time a circuit using a copper paste is fired in a thick-film furnace a lengthy and gas consuming process of purging the furnace must be followed. When this is done without special gas baffles or curtains the results are erratic and often unsatisfactory. There is, therefore, a definate need for a method of firing or sintering thick-film oxidizable circuitry without having to go through the costly and time consuming purging procedure.

SUMMARY OF THE INVENTION

It is, therefore, an object of the present invention to provide a method for making thick-film oxidizable metal circuitry, which method is free of the aforementioned and other such disadvantages.

It is a primary object of the present invention to provide a method of making thick-film oxidizable metal circuitry with positive assurance of firing success.

It is another primary object of the present invention to provide a method for making thick-film oxidizable metal circuitry using conventional furnace equipment.

It is yet another object of the present invention to provide a method for making thick-film oxidizable metal circuitry without the need of a special atmosphere during sintering.

It is a further object of the present invention, consistent with the foregoing objects, to provide a method for sintering thick-film oxidizable metal circuitry including the steps of providing a glass land surrounding the micro circuit and forming a bridge on the substrate, covering the micro circuit with a glass plate in a non-oxidizing atmosphere, and sintering the circuit.

BRIEF DESCRIPTION OF THE DRAWINGS

Other objects, advantages and applications of this invention will be made apparent by the following detailed description. The description makes reference to a preferred and illustrative embodiment of the invention presented in the accompanying drawings wherein.

DETAILED DESCRIPTION OF THE PREFERRED EMBODIMENT

Figure 1:
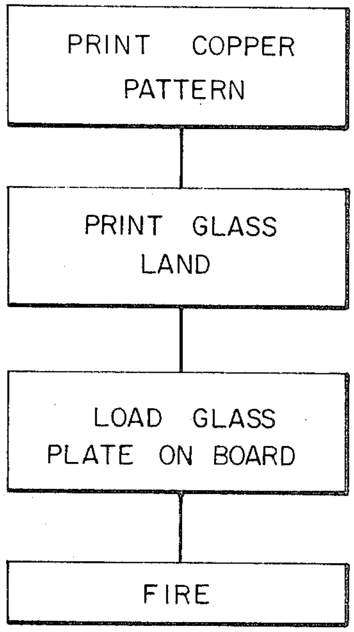
FIG. 1 is a flow diagram illustrating the method of the present invention.

The method of the present invention will be easily understood in its broad aspects by reference to FIG. 1 wherein there is shown a flow diagram of the steps thereof. First, the copper pattern is printed by known methods such as silk-screening using a known copper paste. The glass land, completely surrounding the circuit and forming a bridge, is then printed on the ceramic substrate. The printed glass land is allowed to dry and a glass plate having a corresponding glass land is loaded on the circuit board in a non-oxidizing atmosphere. As will be described more fully hereinbelow the glass plate, which contacts only the glass land, provides an effective seal from the outside atmosphere. The complete assembly is then fired in any suitable conventional furnace.

Figure 3:
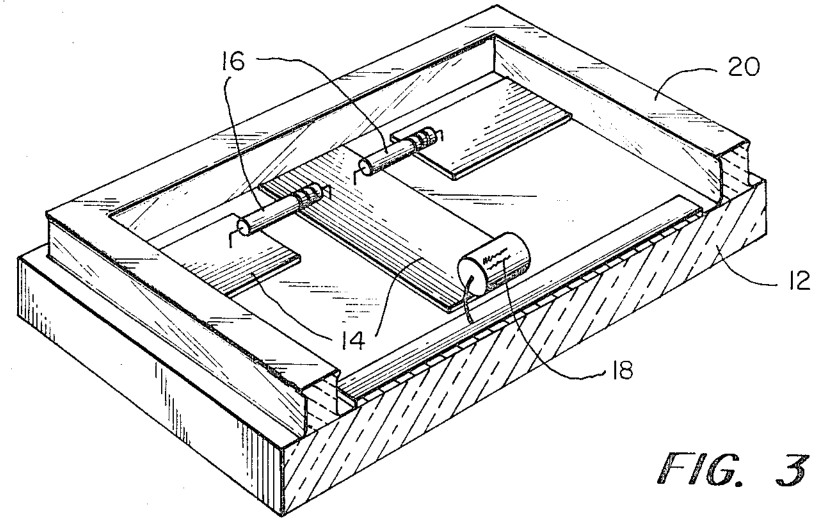
FIG. 3 is a cross-sectional perspective view of the circuit board shown in FIG. 2.
Figure 2:
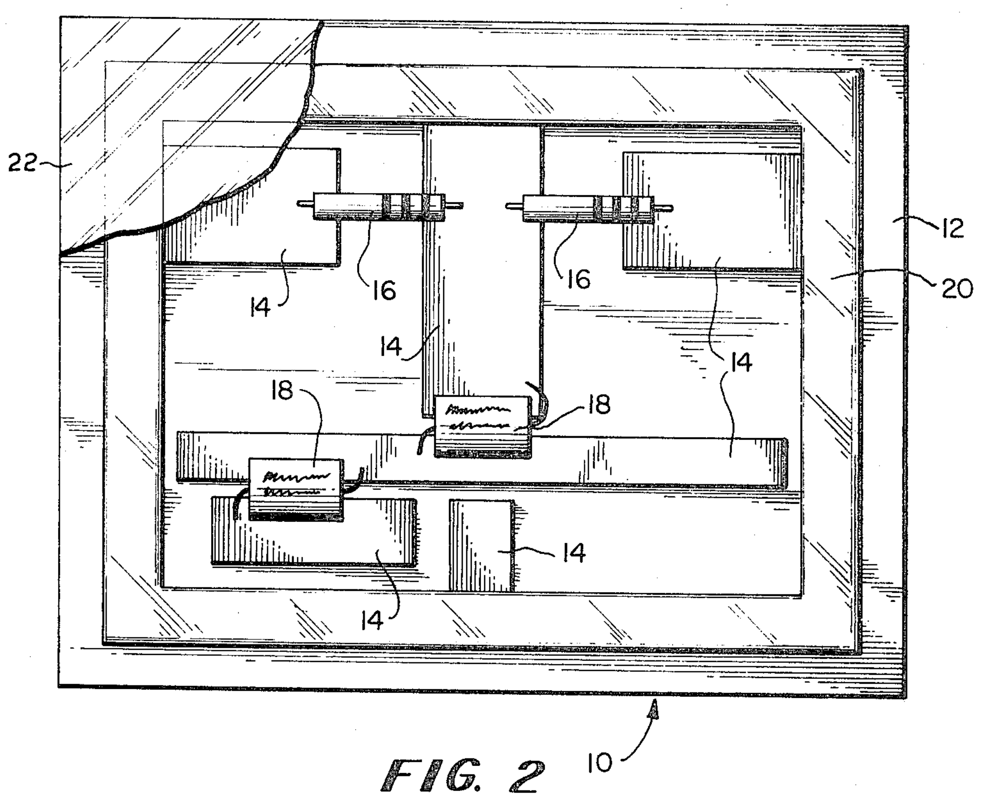
FIG. 2 is a top plan view of a circuit board after application of the glass land according to the present invention.
Figure 4:
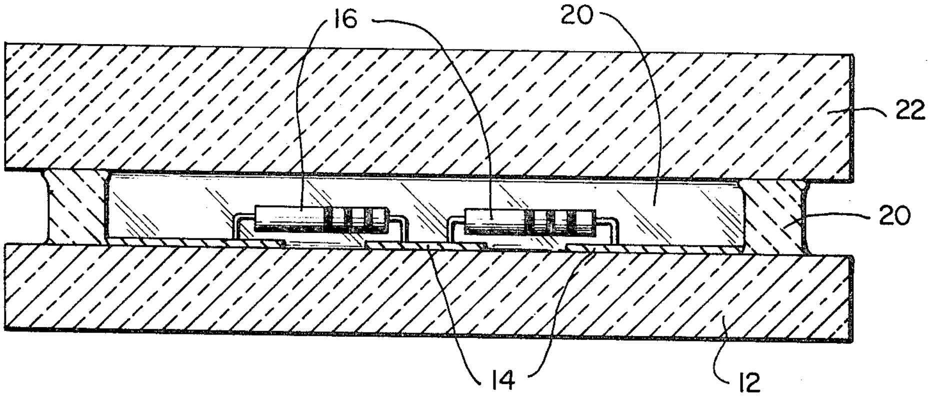
FIG. 4 is a vertical sectional view of a circuit board with the glass land and glass plate applied according to the present invention.

Turning now to FIGS. 2 and 3, there is shown a circuit board generally indicated by the numeral 10, having a ceramic substrate 12 on which has been silk-screened a copper-glass paste to form conductive areas 14. The substrate could be any suitable ceramic material such as porcelains, steatites, ferrites, and aluminas. The substrate of the preferred embodiment is an alumina substrate. The copper paste is of a conventional composition and need not be further described. Various other electronic components suitable for the particular circuit are also used. For purposes of illustration, resistors 16 and capacitors 18 are shown. After the desired circuit is printed using a copper paste, a glass land 20 is then printed onto the substrate. The glass land 20 completely surrounds the circuit and, for purposes of this application could be considered to be generally defining the periphery of the board. The glass land is preferably about 10 mils wide and about four layers high when completed. Generally, the glass land is not over about 10 mils high. After application of the glass land onto the ceramic substrate, the same is allowed to dry and harden. Of course, if the copper pattern is to serve as a conductor network the resistor and capacitor patterns are post-terminated prior to printing the glass land on the substrate.

A matching glass land is printed on the glass plate prior to loading the same onto the circuit board assembly. The glass plate is preferably quartz or Pyrex, Pyrex of course being a borosilicate glass, and is from about 25 to about 40 mils thick. The matching glass land printed on the glass plate is three or four layers thick. When printing the matching glass land on the glass plate, the last layer is left partially viscous. The glass plate is then loaded onto the circuit board assembly so that the glass land on the glass plate matches that on the substrate. The glass plate 22 is loaded onto the circuit board assembly in the non-oxidizing atmosphere selected for the purpose. This atmosphere, in the preferred embodiment, is nitrogen. The exact composition of the non-oxidizing atmosphere is determined by the type of copper paste used and is well-known in the art. After applying the glass plate to the substrate, the complete assembly is then slowly dried thereby creating a solid glass barrier around the copper or other oxidizable circuitry. The complete assembly is then fired in a conventional furnace at the desired temperature for the particular copper composition being used. The furnace can be any conventional furnace and need not be specially adapted for exhausting oxidizing gases therefrom. It should be noted that no thermal stressing occurs during firing because the glass land is partially molten, or viscous. Until the glass land reaches the molten stage it is still plastic. After firing, the structure is uniformly cooled. The glass plate should be at least twice as thick as the substrate to ensure against breaking under stress.

The present invention relies, to a great extent, on the important relationship exhibited by the cover plate and the substrate. This relationship is that the cover plate should have a thermal coefficient of expansion less than that of the substrate. It is for this reason that a ceramic substrate and a glass cover plate are used in the preferred embodiment. The preferred materials, exhibiting these properties, are alumina for the substrate and quartz or Pyrex for the glass cover plate. The glass land should be brittle enough to shear or crack under thermal stress. In order to remove the glass plate, the assembly is subjected to thermal stress by cooling the same below room temperature. Shearing will then occur at the land and the plate may be removed.

Figure 5:
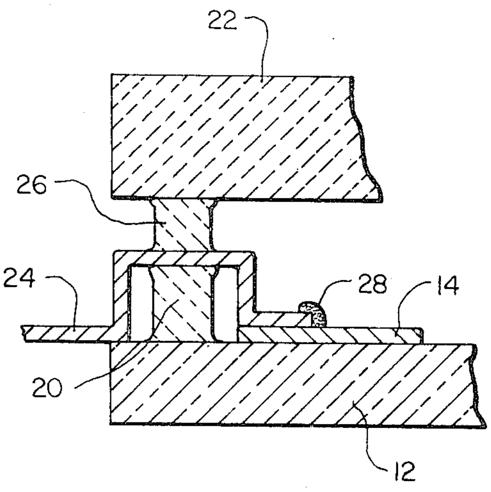
FIG. 5 is a vertical cross-sectional view, partly fragmented, of a circuit board prepared according to the present invention showing one method of securing an external lead thereto.

In order to attach leads to the substrate or connectors the substrate may be larger than the required area in order to permit removal of that area on which the lands are printed without affecting the usable area. This area may be made removable by pre-scribing the substrate or utilizing a substrate having "snap-strate" type perforations. By following this procedure non-oxidized copper exit terminations are available for attachment of leads by ordinary methods such as soldering. Alternatively, the glass lands could be left on the circuit board and tabs or strips of a suitable metal such as Kovar, an alloy containing nickel, cobalt, manganese and a major proportion of iron applied thereto. Attention is directed to FIG. 5 wherein a strip of a metal such as Kovar is shown at 24. The metal strip is bent over the glass land 20 and placed in contact with the desired conductive area 14. Since Kovar is a known glass-sealing metal, it can be placed over the glass land 20 prior to the loading of the cover plate 22 onto the assembly. The matching glass land, shown in FIG. 5 at 26 of the cover plate then seals with the glass land 20 and the metal strip 24. After firing and cooling, when the cover plate 22 is removed by thermal stressing, the glass land assembly will remain with the metal strip sealed in place. The metal strip is then attached to the conductive area 14 by solder 28 or the like.

EXAMPLE

An alumina substrate approximately 1 inch square was printed with a copper based conductive ink having a melting point of 750° C. A glass land was printed on the board and a corresponding glass land was printed on a glass cover plate which was then applied to the board in a box from which air had been purged with an atmosphere of nitrogen having an oxygen content of no more than 0.01 percent. At this partial pressure there is little, if any, tendency for the copper to oxidize at the proper firing temperature. It is important that a small amount of oxygen be present with that particular ink composition to allow for burn out of the temporary binder. The assembly was then fired at a temperature of about 750° C. for about 15 minutes and then uniformly cooled. The glass cover plate was removed by thermal stressing and a satisfactory circuit board was obtained.

It should be understood that the invention is not limited to the exact details of construction shown and described herein for obvious modifications will occur to persons skilled in the art. Accordingly,

What is claimed is:

1. A method of making thick-film oxidizable circuitry comprising the steps of printing a conductive circuit of an oxidizing metal on a ceramic substrate, printing a glass land about the periphery thereof, placing a cover plate onto said glass land while maintaining the same in a non-oxidizing atmosphere, thereby sealing said conductive circuit from the outside atmosphere, and firing the resulting assembly, said cover plate having a thermal coefficient of expansion less than that of said substrate, and further including uniformly cooling the assembly below room temperature thereby thermally stressing said cover plate, and removing said cover plate from said substrate and conductive circuit.

2. A method of making thick-film oxidizable circuitry comprising the steps of printing a conductive circuit of an oxidizing metal on a ceramic substrate, printing a glass land about the periphery thereof, placing a cover plate onto said glass land while maintaining the same in a non-oxidizing atmosphere, thereby sealing said conductive circuit from the outside atmosphere, and firing the resulting assembly, said cover plate having a thermal coefficient of expansion less than that of said substrate, and further including applying a metal strip over said glass land prior to placing said cover plate thereonto such that one end of said metal strip is in contact with at least a portion of said conductive circuit and the other end of said metal strip extends externally of said resulting assembly.

3. A method according to claim 1 wherein said oxidizing metal is copper.

4. A method according to claim 1 wherein said ceramic substrate is alumina.

5. A method according to claim 1 wherein said non-oxidizing atmosphere consists essentially of nitrogen.

6. A method according to claim 1 wherein a matching glass land is printed on said cover plate prior to loacing the same onto said circuit board.

7. A method according to claim 6 wherein said matching glass land is at least partially viscous when said cover plate is applied to said circuit board.

8. A method according to claim 1 wherein said cover plate is a glass plate.

9. A method according to claim 8 wherein said cover plate is made of a member selected from the group consisting of quartz and borosilicate glasses.

10. A method according to claim 2 wherein said oxidizing metal is copper.

11. A method according to claim 2 wherein said ceramic substrate is alumina.

12. A method according to claim 2 wherein said non-oxidizing atmosphere consists essentially of nitrogen.

13. A method according to claim 2 wherein a matching glass land is printed onto said cover plate prior to loading the same onto said circuit board.

14. A method according to claim 13 wherein said matching glass land is at least partially viscous when said cover plate is applied to said circuit board.

15. A method according to claim 2 wherein said cover plate is a glass plate.

16. A method according to claim 15 wherein said cover plate is made of of a member selected from the group consisting of quartz and borosilicate glasses.

* * * * *